US011773933B2

(12) United States Patent
Hollstein et al.

(10) Patent No.: US 11,773,933 B2
(45) Date of Patent: Oct. 3, 2023

(54) COMPOSITE BRAKE DISC FOR A VEHICLE DISC BRAKE

(71) Applicant: Continental Teves AG & Co. oHG, Frankfurt am Main (DE)

(72) Inventors: Frank Hollstein, Frankfurt am Main (DE); Ralph Weller, Frankfurt am Main (DE); Andres Valencia Blazquez, Frankfurt am Main (DE)

(73) Assignee: Continental Teves AG & Co. oHG

(\*) Notice: Subject to any disclaimer, the term of this patent is extended or adjusted under 35 U.S.C. 154(b) by 225 days.

(21) Appl. No.: 17/273,819

(22) PCT Filed: Sep. 6, 2019

(86) PCT No.: PCT/EP2019/073855
§ 371 (c)(1),
(2) Date: Mar. 5, 2021

(87) PCT Pub. No.: WO2020/049162
PCT Pub. Date: Mar. 12, 2020

(65) Prior Publication Data
US 2021/0341024 A1    Nov. 4, 2021

(30) Foreign Application Priority Data

Sep. 7, 2018   (DE) ...................... 10 2018 215 297.7

(51) Int. Cl.
*F16D 65/12*   (2006.01)
*F16D 65/02*   (2006.01)

(52) U.S. Cl.
CPC ......... *F16D 65/123* (2013.01); *F16D 65/125* (2013.01); *F16D 2065/1316* (2013.01);
(Continued)

(58) Field of Classification Search
CPC ... F16D 65/123–128; F16D 2200/0021; F16D 2065/1316; F16D 2065/1328; F16D 2065/1392
(Continued)

(56) References Cited

U.S. PATENT DOCUMENTS 5,823,303 A * 10/1998 Schwarz ............... F16D 65/128
188/218 XL
10,794,441 B2   10/2020 Kokott et al.
(Continued)

FOREIGN PATENT DOCUMENTS

DE   3823146 A1   1/1990
DE   10032972 A1   1/2002
(Continued)

OTHER PUBLICATIONS

International Search Report and Written Opinion for International Application No. PCT/EP2019/073855, dated Dec. 16, 2019, with partial English translation, 7 pages.
(Continued)

*Primary Examiner* — Christopher P Schwartz
(74) *Attorney, Agent, or Firm* — RatnerPrestia

(57) ABSTRACT

A composite brake disk for a vehicle disk brake, including a brake disk pot which is formed from a first material and is connected to a friction ring made of a different material, wherein the pot shell and a circular-cylindrical collar formed on the friction ring overlap in some regions in the radial direction in a connecting region and are penetrated by a plurality of connecting elements oriented substantially orthogonally with respect to the axis of rotation, wherein the composite brake disk is suitable for transmitting high mechanical and thermal loads in all operating states, while being simple to manufacture, and can also be formed with a particularly thin pot base and, for this purpose, enables the (Continued)

collar to engage radially on the outside around the pot shell in the connecting region.

12 Claims, 1 Drawing Sheet

(52) U.S. Cl.
CPC ............... *F16D 2065/1328* (2013.01); *F16D 2065/1392* (2013.01); *F16D 2200/0021* (2013.01)

(58) Field of Classification Search
USPC .................. 188/18 A, 218 A, 218 R, 218 XL
See application file for complete search history.

(56) References Cited

U.S. PATENT DOCUMENTS

| | | | | |
|---|---|---|---|---|
| 11,519,471 | B2* | 12/2022 | Bozovic | ................ F16D 65/123 |
| 2012/0085603 | A1 | 4/2012 | Mayer et al. | |
| 2013/0092486 | A1* | 4/2013 | Gebauer | ............... F16D 65/128 |
| | | | | 188/218 XL |
| 2014/0151166 | A1* | 6/2014 | Tironi | ..................... F16D 65/12 |
| | | | | 188/218 XL |
| 2014/0251740 | A1* | 9/2014 | Valle | ..................... B21D 53/88 |
| | | | | 188/218 XL |

FOREIGN PATENT DOCUMENTS

| | | |
|---|---|---|
| DE | 60313048 T2 | 12/2007 |
| DE | 102008018326 A1 | 10/2009 |
| DE | 102009012216 A1 | 9/2010 |
| WO | 2004085870 A1 | 10/2004 |
| WO | 2017108257 A1 | 6/2017 |

OTHER PUBLICATIONS

German Search Report for German Application No. 10 2018 215 297.7, dated May 13, 2019, with partial English translation, 10 pages.

* cited by examiner

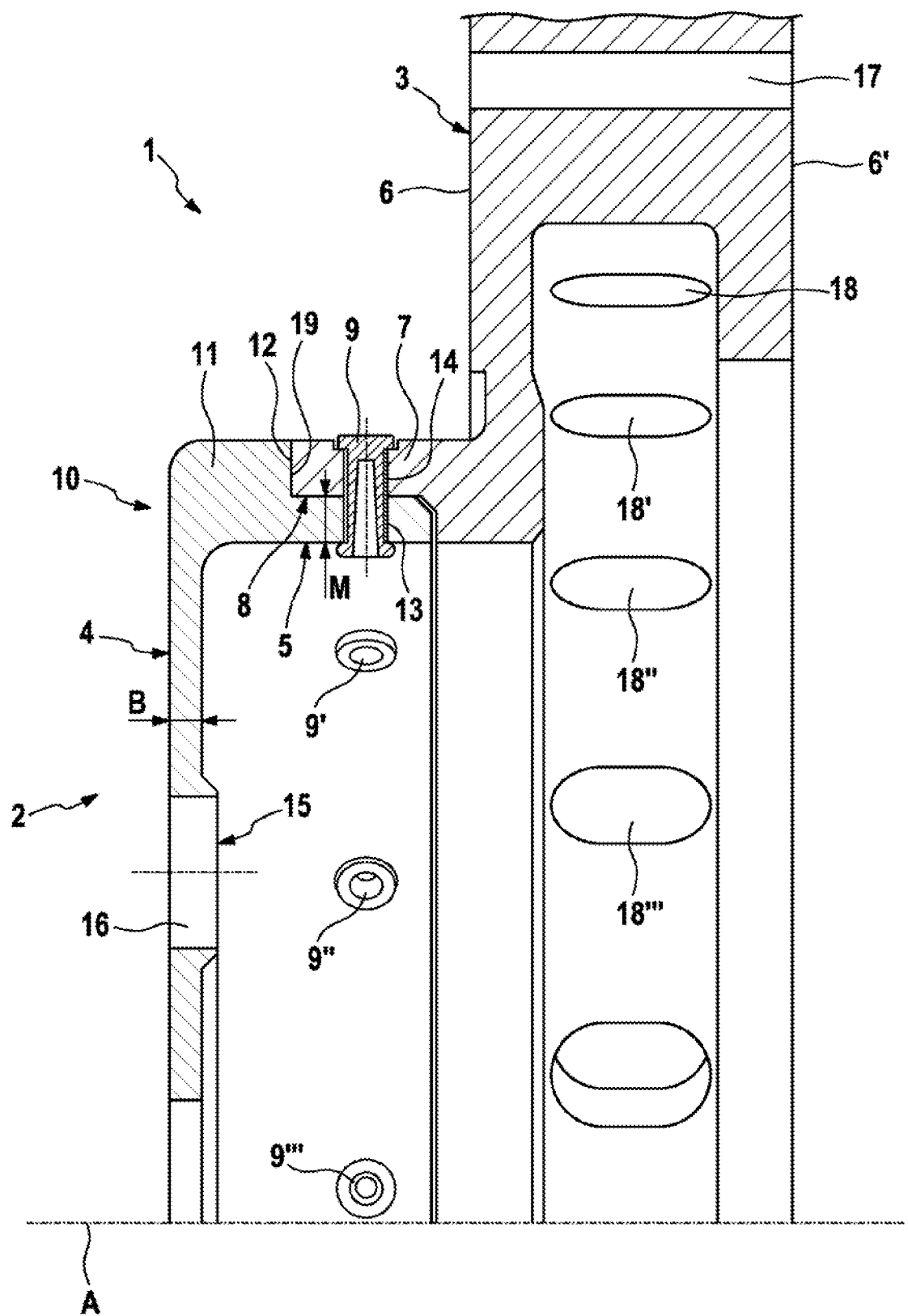

COMPOSITE BRAKE DISC FOR A VEHICLE DISC BRAKE

CROSS REFERENCE TO RELATED APPLICATIONS

This application is the U.S. National Phase Application of PCT International Application No. PCT/EP2019/073855, filed Sep. 6, 2019, which claims priority to German Patent Application No. 10 2018 215 297.7, filed Sep. 7, 2018, the contents of such applications being incorporated by reference herein.

FIELD OF THE INVENTION

The invention relates to a multi-part composite brake disk for a vehicle disk brake, in particular for use in a passenger vehicle or a light commercial vehicle.

BACKGROUND OF THE INVENTION

Modern vehicles have increasingly higher weights and wheels with ever larger diameters. This leads to more powerful brake systems and higher loading of the brake disks.

A brake disk is functionally customarily into a friction ring, which cooperates with brake pads and is provided for converting the kinetic energy into heat, and a brake disk pot for fastening the friction ring to a wheel hub and for transmitting torque.

In particular in order to reduce unsprung masses in the vehicle, it is known, instead of heavy, one-piece cast brake disks, to use what are referred to as composite brake disks, in which the brake disk pot and the friction ring are produced from different, functionally optimized materials and are subsequently joined together. In particular, it is known to produce the friction ring from a friction-optimized gray cast iron material and to produce the brake disk pot from a higher-strength steel material. However, such different materials sometimes have very different physical properties, such as, for example, coefficients of thermal expansion, moduli of elasticity or corrosion resistances, and therefore joining said materials together is a challenge.

DE 10 2009 012 2016 A1, incorporated herein by reference, discloses a composite brake disk with a brake disk pot which is produced from a thin-walled steel sheet and is connected in the radial and circumferential directions to the radial inner edge of the friction ring via a complex, complementary toothed profile and secured to said inner edge in the axial direction by punched and bent tabs.

The advantage of this solution is that the pot base of the brake disk pot is particularly thin and the wheel can be attached very close to the wheel hub axially with advantages in terms of weight, rigidity and transmission of force.

A disadvantage in addition to very high demands on production tools is a relatively low flexural strength, as a result of which the friction ring can easily tilt with respect to the brake disk pot.

A known undesirable phenomenon in brake disks is a heat-related deformation of the friction ring, what is referred to as shielding of the brake disk, which leads to a deterioration in the tribological quality. The brake disk pot can lead to asymmetrical stresses and can intensify or even cause this effect.

Another composite brake disk with a brake disk pot made of steel is known from DE 100 32 972 A1, incorporated herein by reference. The connection to the friction ring is realized by the fact that an axially protruding, circular-cylindrical extension is integrally formed on the friction ring, said extension overlapping with, and being riveted to, the shell of the brake disk pot in the region of the joint.

The problem of shielding is of particular importance. An approach is followed here to obstruct thermal expansion of the friction ring as little as possible and to reduce the influence of the brake disk pot.

For this purpose, the friction ring extension is arranged radially inside the shell of the brake disk pot. Since steel expands more than gray cast iron, an asymmetrical build-up of stress is reduced. Furthermore, it is endeavored to configure the shell to be as elastic as possible in the radial direction, for which purpose said shell is provided with apertures or regions of reduced wall thickness and is made particularly thin in the region of the joint. Such a construction, however, considerably reduces the torsional rigidity of the shell and leads to the build-up of force and stress peaks, in particular in the transition region of the pot base into the shell. This limits the permissible torque or the durability. Furthermore, the pot base has to withstand more torsional stresses and therefore has to be made relatively thick.

SUMMARY OF THE INVENTION

Against this background, an aspect of the present invention is based on the object of proposing an improved, particularly robust composite brake disk which, while being easier to manufacture, is suitable for transmitting high mechanical and thermal loads in all operating states and can be formed with the thinnest possible pot base.

From today's perspective, a shielding tendency or tendency to thermal deformation can be overcome satisfactorily, even in the case of asymmetrical friction rings, by measures other than thermal and stress decoupling, which measures are not the subject matter of an aspect of this invention, for example by skillful distributions of mass on the friction ring.

An aspect of the invention thus proposes that a circular-cylindrical collar formed on the friction ring engages radially on the outside around the pot shell of the brake disk pot in a connecting region. This enables a particularly firm, torsionally and flexurally rigid support of the friction ring on the brake disk pot, said support not being weakened even when the friction ring is heated to a great extent. The adhesion and transmission of torque are even reinforced in a heated state by greater thermal expansion of the brake disk pot, thus providing greater safety in critical driving conditions, such as at high speeds or when driving downhill. In addition, the cooling of the friction ring is improved by the collar surface that is exposed to the relative wind.

According to the particularly preferred embodiment of the invention, the brake disk pot in a transition region between the pot base and the pot shell has a solid, encircling shoulder which is pre-stretched radially outward and is significantly stronger in the radial and axial directions than the base thickness (B), and is preferably at least twice the base thickness radially and axially.

The increased volume of material and increased surface enable heat and flow of force to be better distributed. This mechanically and thermally relieves the stress on the transition region, which is particularly critical with respect to force and tension loading, and the pot base can absorb greater torsional stresses and can transmit higher torques and thus provides greater safety margins. The base thickness can thereby be reduced.

According to a preferred development, the shoulder can be used as an axial stop for the collar, and therefore additional fitting elements are dispensed with, production is simplified and flexural rigidity is further increased.

According to a further advantageous development, the connecting region can be formed with a clearance fit in the radial direction. Production can thereby be simplified because lower tolerance requirements can be assumed in comparison to an interference fit. Furthermore, the risk of damage because of excessive stresses due to the temperature-related particularly great expansion of the brake disk pot is reduced.

The connecting elements can preferably be provided as inexpensive, easy-to-use and securely holding rivets, in particular semi-tubular rivets, which have a particularly well-balanced ratio with regard to the intended use in terms of weight, strength, deformation forces and automation.

According to another embodiment, the connecting elements can also be designed as screw elements, in particular screw and nut combinations, which are subsequently releasable and can be fitted without special tools.

For simple and reliable production and optimal transmission of the torque of the connection, according to an aspect of the invention, the collar and the pot shell can have mutually aligned apertures, in particular bores, in the connecting region, into which the connecting elements are plugged.

For a further improved absorption of torsional stresses and torques and additional stiffening of the pot base, according to the preferred embodiment an encircling bead which is pre-stretched axially in the direction of the friction ring can be formed on the pot base in the region of connecting bores.

An optimal ratio with regard to costs, adjustability, weight and strength of the composite brake disk can be achieved if the brake disk pot is made from a steel material, in particular a high-alloy grade of steel. When rust-resistant or, better, rustproof grades of steel are used, optical properties can additionally also be permanently improved.

The brake disk according to an aspect of the invention can be used particularly effectively with the use of highly loadable, internally ventilated friction rings which, for the purpose of increasing the surface and forming cooling flows, are penetrated by a plurality of channels extending in the axial and/or radial direction.

BRIEF DESCRIPTION OF THE DRAWINGS

An aspect of the invention will be explained in more detail below with reference to the drawing. The FIGURE here depicts a preferred embodiment according to the invention in simplified form in an axial partial section.

DETAILED DESCRIPTION OF THE PREFERRED EMBODIMENTS

The FIGURE

A composite brake disk 1 has a brake disk pot 2 which is preferably formed from steel, such as, for example, from C45, or from another high-alloy, rust-resistant or, particularly preferably, rustproof grade of steel.

The brake disk pot 2 has a multiply perforated, particularly thin-walled pot base 4 extending in the radial direction with respect to the axis of rotation A, and a circular-cylindrical pot shell 5 formed from the pot base 4 concentrically with respect to the axis of rotation A. The base thickness B is provided here so as to be less than the shell thickness M.

The pot base 5 is perforated by a plurality of connecting bores 16, customarily 4 or 5, which are provided for penetrating by wheel screws or wheel bolts for fastening the wheel to the wheel hub. In the embodiment shown, an encircling bead 15, which is axially pre-stretched in the direction of the friction ring 3 and locally increases the base thickness B, is formed in the region of the connecting bores 16 on the pot base 4. A corresponding depression has to be provided for said bead 15 in the corresponding wheel hub.

A friction ring 3 is connected to the brake disk pot 2. Said friction ring 3 has two axially outer friction surfaces 6, 6' aligned in the radial direction.

The friction ring is preferably produced here from cast iron material or gray cast iron material, such as GG20, GG15HC or GG20HC.

In the exemplary embodiment shown, the friction ring 3 is perforated by a multiplicity of axial channels 17 and radial channels 18, 18', . . . . Of course, friction rings which are solid or are penetrated only in one direction are also used within an aspect of the invention.

A circular-cylindrical collar 7 which is pre-stretched concentrically with respect to the axis of rotation A axially in the direction of the brake disk pot 2 is formed on the friction ring 3.

The collar 7 engages around and overlaps the pot shell 5 radially on the outside such that a connecting region 8 is defined by the overlapping region. Between the pot shell 5 and the collar 7, a clearance fit is provided in the connecting region 8 in the radial direction.

In the connecting region 8, the pot shell 5 and the collar 7 are provided with a plurality of apertures 13, 14 which are distributed regularly over the circumference and are each aligned with one another and which are penetrated by connecting elements 9, 9', 9", . . . aligned orthogonally with respect to the axis of rotation A.

In the preferred embodiment shown, the connecting elements 9 are designed as semi-tubular rivets. However, solid or tubular rivets as well as diverse screw and nut connections are permissible within an aspect of the invention.

On the radial outer edge of the pot base 5, in the transition region 10 into the pot shell 5, an encircling shoulder 11 is formed on the brake disk pot 2. Said encircling shoulder 11 represents a type of solid radial local thickening of the pot shell 5 and extends both in the radial and the axial direction by at least twice the base thickness B. With its axial end on the friction-ring side, the shoulder 11 forms an axial stop 12 for the axial end face 19 of the collar 7.

REFERENCE SIGNS

1 Composite brake disk
2 Brake disk pot
3 Friction ring
4 Pot base
5 Pot shell
6 Friction surfaces
7 Collar
8 Connecting region
9 Connecting element
10 Transition region
11 Encircling shoulder
12 Stop
13 Aperture
14 Aperture
15 Bead
16 Connecting bore
17 Channel 18 Channel
19 End face
A Axis of rotation
B Base thickness
M Shell thickness

The invention claimed is:

1. A composite brake disk for a vehicle disk brake, comprising:
a brake disk pot formed from a first material, and
a friction ring, which is formed from a different material and is connected to the brake disk pot,
wherein the brake disk pot has a pot base extending in a radial direction with respect to an axis of rotation, and a circular-cylindrical pot shell extending from the pot base concentrically with respect to the axis of rotation, wherein the friction ring has at least two friction surfaces oriented in the radial direction with respect to the axis of rotation, and a circular-cylindrical collar pre-stretched axially in a direction of the brake disk pot concentrically with respect to the axis of rotation, and wherein the pot shell and the collar overlap in some regions in the radial direction in a connecting region and are penetrated by a plurality of connecting elements oriented substantially orthogonally with respect to the axis of rotation, wherein the collar engages radially on the outside around the pot shell in the connecting region, and
wherein the brake disk pot, in a transition region between the pot base and the pot shell, has a solid, encircling shoulder which is pre-stretched radially outward and, in the radial and axial directions, has a shoulder thickness that is at least twice a base thickness of the pot base.

2. The composite brake disk as claimed in claim 1, wherein the shoulder forms an axial stop for the collar.

3. The composite brake disk as claimed in claim 1, wherein the connecting region has a clearance fit in the radial direction.

4. The composite brake disk as claimed in claim 1, wherein the connecting elements are designed as rivets.

5. The composite brake disk as claimed in claim 1, wherein the connecting elements are designed as screw elements.

6. The composite brake disk as claimed in claim 1, wherein the collar and the pot shell have respective mutually aligned apertures in the connecting region for penetration by the connecting elements.

7. The composite brake disk as claimed in claim 1, wherein the brake disk pot is formed from a steel material.

8. The composite brake disk as claimed in claim 1, wherein the friction ring is perforated by a plurality of channels extending in the axial and/or radial direction.

9. The composite brake disk as claimed in claim 1, wherein the brake disk pot is formed from a rust-resistant steel material.

10. The composite brake disk as claimed in claim 1, wherein the brake disk pot is formed from a high-alloy steel material.

11. The composite brake disk as claimed in claim 1, wherein the collar and the pot shell have respective mutually aligned bores in the connecting region for penetration by the connecting elements.

12. A composite brake disk for a vehicle disk brake, comprising:
a brake disk pot formed from a first material, and
a friction ring, which is formed from a different material and is connected to the brake disk pot,
wherein the brake disk pot has a pot base extending in a radial direction with respect to an axis of rotation, and a circular-cylindrical pot shell extending from the pot base concentrically with respect to the axis of rotation, wherein the friction ring has at least two friction surfaces oriented in the radial direction with respect to the axis of rotation, and a circular-cylindrical collar pre-stretched axially in a direction of the brake disk pot concentrically with respect to the axis of rotation, and wherein the pot shell and the collar overlap in some regions in the radial direction in a connecting region and are penetrated by a plurality of connecting elements oriented substantially orthogonally with respect to the axis of rotation, wherein the collar engages radially on the outside around the pot shell in the connecting region,
wherein an encircling bead which is pre-stretched axially in the direction of the friction ring is formed on the pot base, and axial connecting bores for penetration of wheel screws or wheel bolts are arranged in the region of the bead, and
wherein the encircling bead forms an increased thickness relative to the base thickness in a region of the axial connecting bores.

* * * * *